United States Patent
Cao et al.

(10) Patent No.: US 11,474,541 B2
(45) Date of Patent: Oct. 18, 2022

(54) DYNAMIC RECOVERY METHOD AND SYSTEM FOR UAVS AND STORAGE MEDIUM

(71) Applicant: Beihang University, Beijing (CN)

(72) Inventors: Xianbin Cao, Beijing (CN); Wenbo Du, Beijing (CN); Lei Zheng, Beijing (CN); Liang Xu, Beijing (CN); Yakun Zhao, Beijing (CN)

(73) Assignee: Beihang University, Beijing (CN)

(*) Notice: Subject to any disclaimer, the term of this patent is extended or adjusted under 35 U.S.C. 154(b) by 56 days.

(21) Appl. No.: 17/102,943

(22) Filed: Nov. 24, 2020

(65) Prior Publication Data

US 2021/0294356 A1 Sep. 23, 2021

(30) Foreign Application Priority Data

Mar. 19, 2020 (CN) .......................... 202010196990.6

(51) Int. Cl.
*G05D 1/10* (2006.01)
*G06Q 10/04* (2012.01)
*G08G 5/00* (2006.01)

(52) U.S. Cl.
CPC ........... *G05D 1/104* (2013.01); *G05D 1/1064* (2019.05); *G06Q 10/047* (2013.01); *G08G 5/0043* (2013.01)

(58) Field of Classification Search
CPC .... G05D 1/104; G05D 1/1064; G06Q 10/047; G08G 5/0043; G08G 5/0013; G08G 5/0026; G08G 5/006; G08G 5/0069; G08G 5/045; G05B 13/042; G05B 13/0265

See application file for complete search history.

(56) References Cited

U.S. PATENT DOCUMENTS

2018/0327091 A1* 11/2018 Burks ..................... B64F 1/007

FOREIGN PATENT DOCUMENTS

| CN | 110217403 A | 9/2019 | |
|---|---|---|---|
| CN | 110304239 A | 10/2019 | |
| WO | WO-2008147681 A2 * | 12/2008 | ........... B64C 39/024 |

* cited by examiner

*Primary Examiner* — Imran K Mustafa
*Assistant Examiner* — Shon G Foley
(74) *Attorney, Agent, or Firm* — Calfee Halter & Griswold LLP (57) ABSTRACT

The disclosure provides a dynamic recovery method and system for UAVs and storage medium. On the basis of obtaining the environmental information of UAVs, combined with different factors such as the following task quantity of each UAV, the distance from the current position of each UAV to the recovery point, current performance of each UAV, total cost function is constructed, and optimization is carried out through improved particle swarm optimization algorithm. Then on the premise of the lowest recovery cost, the priority of each UAV is obtained. For the ordered UAV, the route to the recovery point is determined. At the same time, it is necessary to consider conflict resolution of UAVs when encountering obstacles in the flight process, as well as the possible failure in line recovery. At this time, it is necessary to reorder some hovering UAVs to ensure flight safety of UAVs and robustness of the algorithm.

9 Claims, 2 Drawing Sheets

DYNAMIC RECOVERY METHOD AND SYSTEM FOR UAVS AND STORAGE MEDIUM

CROSS-REFERENCE TO RELATED APPLICATIONS

This application claims priority to Chinese Patent Application No. 202010196990.6, filed on Mar. 19, 2020, which is hereby incorporated by reference in its entirety.

TECHNICAL FIELD

The disclosure involves the technical field of UAV (Unmanned Aerial Vehicle), and relates to a dynamic recovery method and system of UAVs and storage medium.

BACKGROUND

UAV has many advantages such as low cost, low loss, high survival rate and so on. At present, it has been applied in many fields such as military reconnaissance, disaster monitoring, pesticide spraying, express transportation and so on. With the increasingly complex and changeable flight environment, the executive ability of a single UAV is difficult to meet the actual task requirements. Multi UAVs formation to complete the task together becomes the main mode in the future UAVs.

UAVs can control a larger range, achieve complementary functions and task sharing and so on. Therefore, UAVs can perform complex tasks, shorten the duration of performing task and improve the efficiency of attendance. It is of great significance for the UAVs formation to complete the given task cooperatively.

The task being completed cooperatively by UAVs cluster involves key technologies such as cluster control technology, cluster communication network design, task planning technology, cluster launch and recovery and so on. Among them, cluster launch and recovery technology are key steps in the task performed by the cluster. To improve the launch efficiency of UAVs means to form a large number of multi-wave UAVs flying rapidly. At the same time, as a simple rear support for UAVs flying, UAVs recovery technology can not only improve the quality of information obtained by the UAVs, but also reuse the recovered UAVs, greatly reducing UAVs cost.

Traditional UAV recovery technologies include parachute recovery technology, net recovery technology, line recovery technology and mechanical arm recovery technology and so on, and most of them are for a single UAV. With the development of UAV towards miniaturization and cluster, a large number of UAVs will be released in the first time when the UAVs are performing their tasks to establish the network in the air. The dynamic recovery of UAVs will be the simplest logistics support scheme for UAVs to perform tasks. How to dynamically recycle the entire UAVs is a problem to be solved.

SUMMARY

Based on the above problems, the disclosure provides a dynamic recovery method of UAVs, which ensures the robustness of the algorithm and realizes the dynamic recovery of UAVs by prioritizing the UAVs and flying them to the recovery point in order.

The dynamic recovery method of UAVs comprises the following steps:

step 1: in complex environment, UAVs obtain their own performance information and task information;

the task information includes: the current position of each UAV, the position of recovery point, the coordinates of obstacles within the detection radius of each UAV and the coordinate positions of other UAVs;

its performance information includes: the current flight time of UAV before recovery, the number of tasks to be performed by UAV and whether UAV is damaged.

Step 2: according to the performance information and task information of each UAV, the total cost function F of dynamic recovery for UAVs is established.

Firstly, for a UAV i, the total cost function $f_i$ is calculated according to its recovery order.

The calculation formula is as follows:

$$f_i = f_{1i} + f_{2i} + f_{3i} + f_{4i} + f_{5i} + f_{6i}$$

$f_{1i}$ is the cost function related to the recovery order generated according to the number of tasks $Q_i$ waiting to be completed of UAV i after recovery. The specific formula is as follows:

$$f_{1i} = O_i \cdot (Q_i)^{\alpha_1}$$

wherein, $O_i$ is a permutation of N UAVs; $\alpha_1$ is the intensity parameter of the effect of the number of tasks waiting to be completed $Q_i$ on the cost function;

$f_{2i}$ is the cost function related to the recovery order generated according to the time $T_i^p$ needed to complete other tasks of UAV i after recovery. The specific formula is as follows:

$$f_{2i} = O_i \cdot (T_i^p)^{\alpha_2},$$

$\alpha_2$ is the intensity parameter of the effect of the time needed to complete other tasks $T_i^p$ on the cost function.

$f_{3i}$ is the cost function related to the recovery order generated according to the distance $L_i$ between the current position and the recovery point of UAV i. The specific formula is as follows:

$$f_{3i} = \frac{(L_i)^{\alpha_3}}{O_i},$$

$\alpha_3$ is the intensity parameter of the effect of the distance $L_i$ on the cost function.

$f_{4i}$ is the cost function related to the recovery order generated based on the number of obstacles $C_i$ of UAV i that may be encountered in flight. The specific formula is as follows:

$$f_{4i} = \frac{(C_i)^{\alpha_4}}{O_i},$$

$\alpha_4$ is the intensity parameter of the effect of the number of obstacles $C_i$ on the cost function.

$f_{5i}$ is the cost function related to the recovery order generated based on the current damage severity $D_i$ of UAV i. The specific formula is as follows:

$$f_{5i} = O_i \cdot (D_i)^{\alpha_5},$$

$\alpha_5$ is the intensity parameter of the effect of the current damage severity $D_i$ on the cost function.

$f_{6i}$ is the cost function related to the recovery order generated according to the current flight time $T_i^r$ of UAV i. The specific formula is as follows:

$$f_{6i} = O_i \cdot (T_i^r)^{\alpha_6}$$

$\alpha_6$ is the intensity parameter of the effect of the current flight time $T_i^r$ on the cost function.

Then, for N UAVs among the whole UAVs, the total cost function F generated by recovery order is as follows:

$$F = \sum_{i=1}^{N} f_i,$$

After expansion, the cost function of the dynamic recovery for UAVs is obtained:

$$F = \sum_{i=1}^{N} \left( O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6} \right)$$

N is the number of all UAVs.

Step 3: The improved particle swarm optimization algorithm is used to optimize the total cost function F, and the optimal recovery order of N UAVs is obtained;

In particle swarm optimization algorithm, the speed and position updating formulas of the qth position of the sth particle in the (t+1) generation are as follows:

$$v_{sq}(t+1) = v_{sq}(t) + c_1 \times \text{rand}(\ ) \times (\text{pbest}_{sq}(t) - x_{sq}(t)) + c_2 \times \text{rand}(\ ) \times (\text{gbest}_{sq}(t) - x_{sq}(t)),$$

$$x_{sq}(t+1) = x_{sq}(t) + v_{sq}(t+1).$$

Where s=1, 2, . . . , n, n is the number of particles. Each particle is a permutation of (1, 2, . . . , N), and each permutation corresponds to a value of the cost function F. $v_{sq}(t)$ is the velocity of the q th position of the sth particle in the t generation, $c_1$ and $c_2$ are two constants, and rand( ) is the uniform random number in [0,1], $\text{pbest}_{sq}(t)$ is the qth position of the historical optimal solution of the sth particle in the t generation, $x_{sq}$ (t) is the qth position of the sth particle in the t generation, $\text{gbest}_{sq}(t)$ means that after the historical optimal solutions of the top three particles in the t generation are determined, the qth position corresponding to a solution is randomly selected from the three historical optimal solutions.

After the qth position of the sth particle is updated by the formula, the original position is replaced with the new position. All the initial particles are optimized by generation T, and the optimal solution is the optimal dynamic recovery order for UAVs.

Step 4: Each UAV is recovered according to the priority order, and whether the UAVs encounter conflict in the dynamic recovery process is judged. If yes, the UAV carries out conflict resolution and flies back in order. If not, the UAV flies back in order.

The conflict resolution calculation formula of UAV i is as follows:

$$\vec{v_i}(t+1) = \frac{\vec{v_i}(t+1) + w\vec{g_i}}{|\vec{v_i}(t+1) + w\vec{g_i}|}.$$

Where $\vec{v_i}(t+1)$ is the flight speed of UAV i in the next time step when encountering conflict, w is the influence weight of priority flight direction, $\vec{g_i}$ is the direction vector of priority flight of UAV i (from current position to the recovery point), $\vec{v_i}(t+1)$ is the adjustment speed of UAV i in the next time step when encountering conflict; the calculation formula is as follows:

$$\vec{v_i}(t+1) = -\sum_{j=1}^{n_D} \frac{\vec{r_{ij}}(t)}{|\vec{r_{ij}}(t)|};$$

$n_D$ is the number of obstacles and other UAVs within the detection radius $R_D$ of UAV i at time t, and $\vec{r_{ij}}(t)$ represents the relative position of UAV i, obstacles and other UAV j at time t.

Step 5: After some UAVs arrive at the specific recovery area, they wait in line and hover around to judge whether there are UAVs that fail to complete line recovery. If yes, we reorder some UAVs that failed in recovery. If not, we recycle in order until recovery is completed.

The cost formula $F_f$ of reordering is as follows:

$$F_f = \sum_{i=1}^{N_f} (O'_i \cdot (Q_i)^{\alpha_1} + O'_i \cdot (T_i^p)^{\alpha_2} + O'_i \cdot (D_i)^{\alpha_5} + O'_i \cdot (T_i^r)^{\alpha_6}).$$

$O'_i$ is a permutation of $N_f$ hovering UAVs.

The improved particle swarm optimization algorithm is used to solve the problem again, and the optimal solution is the optimal recovery order of UAVs hovering around.

The disclosure has the advantages of:

1. The disclosure provides a dynamic recovery method for UAVs, which can realize the efficient dynamic recovery of UAVs in complex environment, and further cooperate to complete the follow-up tasks, which provides a new solution for the dynamic recovery problem of UAVs.

2. The disclosure provides a dynamic recovery method for UAVs. Starting from improving the safety and efficiency of air traffic system, the dynamic recovery method for UAVs is studied to ensure the flight safety of UAV, reduce the flight cost and improve the use efficiency of UAVs.

3. The disclosure provides a dynamic recovery method for UAVs, which can deal with the dynamic recovery problem of a large number of UAVs, so that the UAV can quickly recycle and complete other tasks after completing the flight task. The algorithm has low complexity and high precision, which can effectively solve the dynamic recovery problem of UAVs in complex environment.

DESCRIPTION OF EMBODIMENTS

In order to facilitate the understanding and implementation of the disclosure by ordinary technical personnel in the field, the disclosure is further described in detail and in depth in combination with the drawings.

The disclosure provides a dynamic recovery method for UAVs. On the basis of obtaining the environment information of UAVs, combining with factors such as the following task quantity of each UAV, the distance between each UAV and recovery point, the current performance of each UAV and the different environment and so on, the priority of UAVs is carried out by improved particle swarm optimization algorithm, which makes the total recovery cost of UAVs the lowest. After the recovery order is determined, the route of ordered UAVs to the recovery point should be determined. At the same time, if the UAVs encounter obstacles in the flight process, conflict resolution is needed to ensure the flight safety of UAVs. Finally, taking line recovery as an example, it is also necessary to consider the actual recovery failure of UAVs in line recovery. At this time, it is necessary to reorder some hovering UAVs to ensure the flight safety of UAVs and the robustness of the algorithm.

Figure 1:
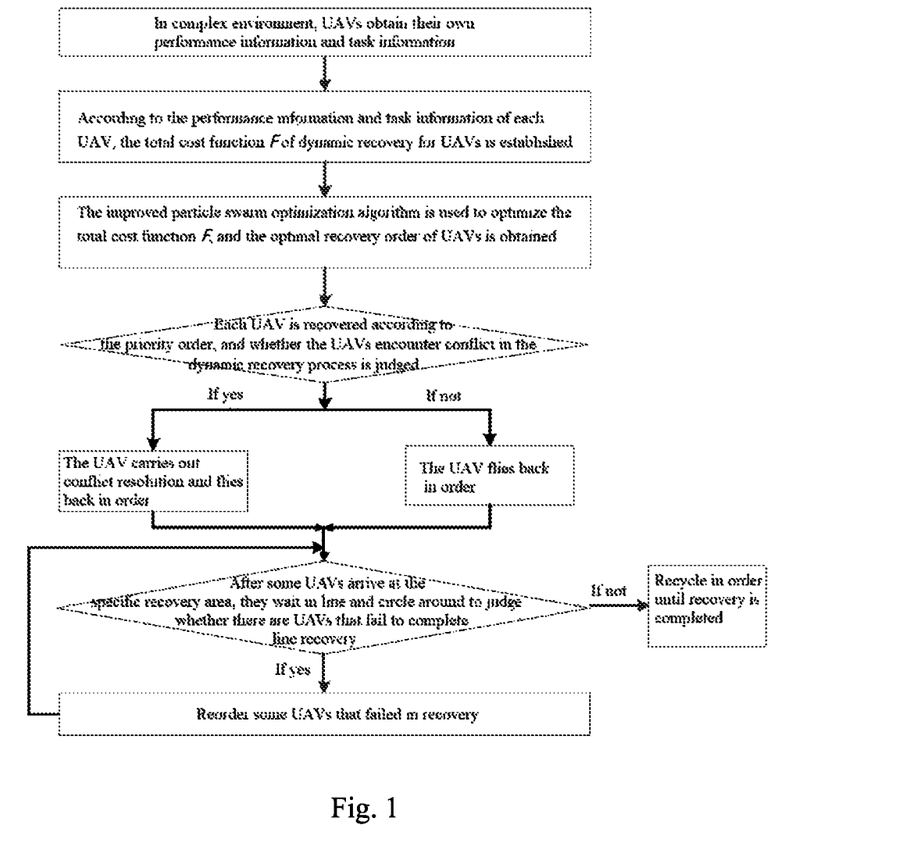
FIG. 1 is a flow chart of a dynamic recovery method for UAVs according to the present application.

As shown in FIG. 1, the dynamic recovery method for UAVs includes the following steps:

step 1: UAVs obtain environment information and their own performance and task information.

In complex flight environment, UAV may face a variety of static or dynamic threats, such as trees, buildings, motor vehicles or other UAVs, so it is necessary to obtain environmental information.

Each UAV obtains its task information in the flight scene, including: the current position of each UAV, the position of UAV recovery point, so as to determine the flight direction of UAVs; it also includes the coordinates of obstacles within the detection radius of each UAV and the coordinates of other UAVs, so as to avoid obstacles in the flight process of each UAV;

UAV also needs to know its own performance and state information, such as the current flight time of each UAV before recovery, the number of tasks to be performed by each UAV after recovery, and whether the UAV is damaged or not.

Step 2: according to the performance information and task information of each UAV, the total cost function F of dynamic recovery for UAVs is established;

In the process of dynamic recovery of UAVs, we must consider various factors such as the different number of UAVs, the difference of task, the difference of flight environment, the current performance of UAVs and so on. The priority of dynamic recovery process of each UAV among UAVs can be ranked, and then the dynamic recovery can be carried out according to the priority. The optimization index is the result of priority ranking, that is, the recovery order of UAVs.

The disclosure considers the following factors for the recovery order of a single UAV, which are all cost functions related to the recovery order.

1. The task requirements of UAV.

Assuming that for UAV i, the number of tasks waiting to be completed after recovery is $Q_i$ and the waiting time needed to complete the tasks is $T_i^p$, then the higher the $Q_i$ and $T_i^p$, the more backward the recovery order of UAV i is, the greater the recovery order cost is. The cost of recovery order is positively correlated with the size of $Q_i$ and $T_i^p$.

The recovery order cost of UAV i according to $Q_i$ is defined as $f_{1i}$. The specific formula is as follows:

$$f_{1i}=O_i \cdot (Q_i)^{\alpha_1}.$$

Wherein, $O_i$(i=1, 2, ..., N) is a permutation of N UAVs; $\alpha_1$ is the intensity parameter of the effect of $Q_i$ on the cost function. The reason why $\alpha_1$ is placed in the power exponent is that the more tasks the UAV wait to complete, in addition to the time required to complete the tasks, additional time consumption such as recovery and maintenance should be considered.

Similarly, the recovery order cost of UAV i according to $T_i^p$ is defined as $f_{2i}$. The specific formula is as follows:

$$f_{2i}=O_i \cdot (T_i^p)^{\alpha_2}.$$

Where $\alpha_2$ is the intensity parameter of the effect of $T_i^p$ on the cost function.

2. The flight environment of UAV.

Assuming that the distance between the current position of UAV and the recovery point is $L_i$ for UAV i, the environmental complexity of flying to the recovery point mainly considers the number of obstacles $C_i$ that may be encountered. Different from the impact of task requirements on the cost, the higher the $L_i$ and $C_i$ are, the more backward the recovery order of UAV i is, the lower the recovery order cost of UAV i is. The cost of recovery order is inversely related to the size of $L_i$ and $C_i$. This is because the larger the $L_i$ and $C_i$, the more time it takes for UAV i to fly to the recovery point. If the recovery order is too forward, UAV i cannot fly to the recovery point in a short time. On the contrary, it will affect the recovery of other UAVs among the UAVs and increase the total recovery cost.

The recovery order cost of UAV i according to $L_i$ is defined as $f_{3i}$. The specific formula is as follows:

$$f_{3i} = \frac{(L_i)^{\alpha_3}}{O_i}$$

Where $\alpha_3$ is the intensity parameter of the effect of $L_i$ on the cost function.

Similarly, the recovery order cost of UAV i according to $C_i$ is defined as $f_{4i}$. The specific formula is as follows:

$$f_{4i} = \frac{(C_i)^{\alpha_4}}{O_i}$$

Where $\alpha_4$ is the intensity parameter of the effect of $C_i$ on the cost function.

3. The current performance of UAV.

Assuming that the current damage severity of UAV i is $D_i$ and the current flight time of UAV i is $T_i^r$. Then, with the increase of $D_i$ and $T_i^r$, the more backward the recovery order of UAV i is, the greater the recovery order cost will be. The cost of recovery order is positively correlated with the size of $D_i$ and $T_i^r$. This is because the greater the damage UAV i suffers and the greater the current flight time (the shorter the remaining flight time), the more it needs to be recovered and maintained in time.

The recovery order cost of UAV i according to $D_i$ is defined as $f_{5i}$. The specific formula is as follows:

$$f_{5i}=O_i \cdot (D_i)^{\alpha_5}$$

Where $\alpha_5$ is the intensity parameter of the effect of $D_i$ on the cost function.

Similarly, the recovery order cost of UAV i according to $T_i^r$ is defined as $f_{6i}$. The specific formula is as follows:

$$f_{6i}=O_i \cdot (T_i^r)^{\alpha_6}$$

Where $\alpha_6$ is the intensity parameter of the effect of $T_i^r$ on the cost function.

When the above factors are determined, the total cost of UAV i according to its recovery order $O_i$ is defined as $f_i$, and the calculation formula of $f_i$ is as follows:

$$f_i=f_{1i}+f_{2i}+f_{3i}+f_{4i}+f_{5i}+f_{6i}$$

Assuming that there are N UAVs in the whole UAV group, the total cost F generated by the whole UAV group according to its recovery order is as follows:

$$F=\Sigma_{i=1}^N f_i.$$

After expansion, the formula is as follows:

$$F = \sum_{i=1}^{N}\left(O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6}\right)$$

Accordingly, the overall recovery cost corresponding to the priority sequence of the whole UAV group is obtained. The lower the cost, the higher the profit. And the next goal is to optimize the value of the independent variables of the objective function, that is, the final recovery order of UAVs, so that the overall recovery cost is low.

Step 3: The improved particle swarm optimization algorithm is used to optimize the total cost function F, and the optimal recovery order of UAVs is obtained;

Initialize n recovery orders, each recovery order is a permutation of (1, 2, . . . , N) and corresponds to a value of the cost function F. The goal is to iteratively optimize the initial recovery order through particle swarm optimization algorithm, and each recovery order is constantly updated. After a certain number of iterations, an optimal recovery order is finally obtained, that is to make the value of cost function F the lowest.

In particle swarm optimization algorithm, the speed and position updating formula of the qth position of the sth particle (that is the sth recovery order) in the (t+1) generation are as follows:

$$v_{sq}(t+1) = v_{sq}(t) + c_1 \times \text{rand}(\ ) \times (\text{pbest}_{sq}(t) - x_{sq}(t)) + c_2 \times \text{rand}(\ ) \times (\text{gbest}_{sq}(t) - x_{sq}(t)).$$

$$x_{sq}(t+1) = x_{sq}(t) + v_{sq}(t+1).$$

Where s=1, 2, . . . , n, $v_{sq}(t)$ is the velocity of the qth position of the sth particle (that is the sth recovery order) in the t generation, $x_{sq}(t)$ is the qth position of the sth particle (that is the sth recovery order) in the t generation. The recovery order of each particle is evaluated by the cost function. $c_1$ and $c_2$ are two constants, and rand( ) is the uniform random number in [0,1], $\text{pbest}_{sq}(t)$ is the qth position of the historical optimal solution of the sth particle in the t generation, $\text{gbest}_{sq}(t)$ means that after the historical optimal solutions of the top three particles in the t generation are determined, the qth position corresponding to a solution is randomly selected from the three historical optimal solutions. The reason why we don't choose the best solution, but choose the best solution in the first three randomly is to ensure the randomness of the algorithm.

It is worth noting that after the qth position of the sth particle (that is the sth recovery order) is updated by formula, it is necessary to make improvement based on the background of the problem which is different from the original PSO algorithm directly updating the next position. Because each solution is a permutation of (1, 2, . . . , N), after updating a certain position, the original position must be replaced with the new position. This is to ensure that the updated solution is also a permutation of (1, 2, . . . , N) and the algorithm can continue. After all the initial particles are optimized by iteration of generation T, the final optimal solution is the optimal recovery order of UAVs.

Step 4: Each UAV is recovered according to the priority order, and whether the UAVs encounters conflict in the dynamic recovery process is judged. If yes, the UAV carries out conflict resolution and flies back in order. If not, the UAV flies back in order.

Figure 2:
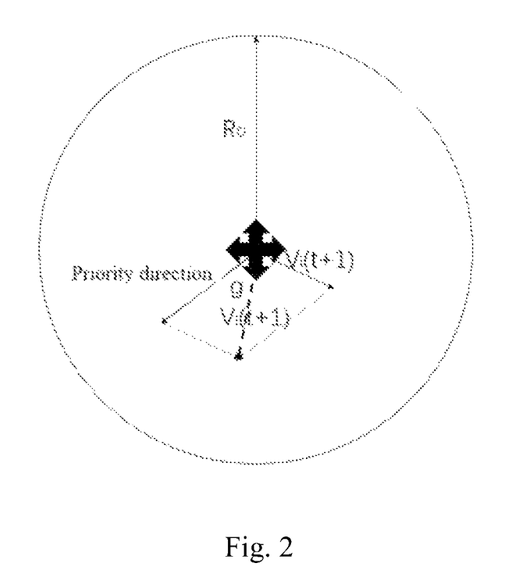
FIG. 2 is the schematic diagram of conflict resolution of UAV in the recovery process according to the present application.

As shown in FIG. 2, the UAV has a detection radius $R_D$. Taking UAV i as an example, it is assumed that the number of obstacles and other UAVs within the detection radius of UAV i at time t is $n_D$, then the flight speed of UAV i in the next time step is adjusted according to the following formula:

$$\vec{v_i}(t+1) = -\sum_{j=1}^{n_D} \frac{\vec{r_{ij}}(t)}{|\vec{r_{ij}}(t)|}.$$

Where $\vec{r_{ij}}(t)$ is the relative position of UAV i, obstacles and other UAV j at time t, i.e. UAV i flies away from risk, which is of great significance for the flight safety of UAV.

At the same time, UAV i also has a priority flight direction vector $\vec{g_i}$. the direction of vector $\vec{g_i}$ is the direction that the current position of UAV i points to the recovery point.

Considering the above two factors, when the UAV i encounters a conflict, the flight speed of UAV i in the next time step is:

$$\vec{v}_I(t+1) = \frac{\vec{v_i}(t+1) + w\vec{g_i}}{|\vec{v_i}(t+1) + w\vec{g_i}|}.$$

Where w is the weight of the priority direction. In this way, the UAV i can not only fly to the target direction, but also achieve conflict resolution.

Step 5: After some UAVs arrive at the specific recovery area, they wait in line and hover around to judge whether there are UAVs that fail to complete line recovery. If yes, we reorder some UAVs that failed in recovery. If not, we recycle in order until recovery is completed.

The UAV may encounter the situation of actual recovery failure in line recovery. At this time, it is necessary to reorder some of the UAVs hovering and waiting (assuming its number is $N_f$) among the UAVs to ensure the robustness of the algorithm.

At this time, because the UAV is near the recovered ship, the UAVs flight environment is not considered, only the UAVs task requirements and current performance are considered, and the UAVs that failed to be recovered and some of the UAVs hovering and waiting are reordered. The cost formula $F_f$ is defined as follows:

$$F_f = \sum_{i=1}^{N_f}(O'_i \cdot (Q_i)^{\alpha_1} + O'_i \cdot (T_i^p)^{\alpha_2} + O'_i \cdot (D_i)^{\alpha_5} + O'_i \cdot (T_i^r)^{\alpha_6}).$$

Where O'(i=1, 2, . . . , $N_f$) is a permutation of (1, 2, . . . , $N_f$).

The improved particle swarm optimization algorithm is used to solve the problem again, and the optimal solution is the optimal recovery order of UAVs hovering and waiting.

The disclosure can realize the dynamic recovery of UAVs under complex conditions, realize the efficient flight and dynamic recovery of UAVs, and complete the assigned tasks cooperatively, which has positive significance.

A storage medium comprising instructions that when executed cause a processor of a computing device to:

in complex environment, obtain their own performance information and task information by UAVs;

wherein the task information comprises: the current position of each UAV, the position of recovery point, the coordinates of obstacles within the detection radius of each UAV and the coordinate positions of other UAVs; its performance information comprises: the current flight time of each UAV before recovery, the number of tasks to be performed by each UAV and whether the UAV is damaged, according to the performance information and task information of each UAV, establish the total cost function F of dynamic recovery for UAVs, and the total cost function is calculated as follows:

$$F = \sum_{i=1}^{N} \left( O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6} \right)$$

wherein, $O_i$ is a permutation of N UAVs; $Q_i$ is the number of tasks waiting to be completed after UAV i is recovered; $\alpha_1$ is the intensity parameter of the effect of the number of tasks waiting to be completed $Q_i$ on the cost function; $T_i^p$ is the waiting time needed to complete other tasks after UAV i is recovered; $\alpha_2$ is the intensity parameter of the effect of the waiting time needed to complete other tasks $T_i^p$ on the cost function; $L_i$ is the distance from the current position of UAV i to the recovery point; $\alpha_3$ is the intensity parameter of the effect of the distance $L_i$ on the cost function; $C_i$ is the number of obstacles that UAV i may encounter in flight; $\alpha_4$ is the intensity parameter of the effect of the number of obstacles $C_i$ on the cost function; $D_i$ is the current damage severity of UAV i; $\alpha_5$ is the intensity parameter of the effect of the current damage severity $D_i$ on the cost function; $T_i^r$ is the current flight time of UAV i; $\alpha_6$ is the intensity parameter of the effect of the current flight time $T_i^r$ on the cost function;

by using the improved particle swarm optimization algorithm, optimize the total cost function F, and obtain the optimal recovery order of UAVs;

in particle swarm optimization algorithm, the speed and position updating formula of the qth position of the sth particle in the (t+1) generation are as follows:

$$v_{sq}(t+1) = v_{sq}(t) + c_1 \times \text{rand}(\ ) \times (\text{pbest}_{sq}(t) - x_{sq}(t)) + c_2 \times \text{rand}(\ ) \times (\text{gbest}_{sq}(t) - x_{sq}(t));$$

$$x_{sq}(t+1) = x_{sq}(t) + v_{sq}(t+1);$$

wherein s=1, 2, . . . , n is the number of particles, each particle is a permutation of (1, 2, . . . , N), and each permutation corresponds to a value of the cost function F; $v_{sq}(t)$ is the velocity of the qth position of the sth particle in the t generation, $c_1$ and $c_2$ are two constants, and rand( ) is the uniform random number in [0,1], $\text{pbest}_{sq}(t)$ is the qth position of the historical optimal solution of the sth particle in the t generation, $x_{sq}(t)$ is the qth position of the sth particle in the t generation, $\text{gbest}_{sq}(t)$ means that after the historical optimal solutions of the top three particles in the t generation are determined, the qth position corresponding to a solution is randomly selected from the three historical optimal solutions;

recover each UAV according to the priority order, and judge whether the UAVs encounter conflict in the dynamic recovery process, if yes, the UAV carries out conflict resolution and flies back in order, if not, the UAV flies back in order, the conflict resolution calculation formula of UAV i is as follows:

$$\vec{v}_I(t+1) = \frac{\vec{v}_i(t+1) + w\vec{g_i}}{|\vec{v}_i(t+1) + w\vec{g_i}|},$$

where $\vec{v}_i(t+1)$ is the flight speed of UAV i in the next time step when encountering conflict, w is the influence weight of priority flight direction, $\vec{g}_i$ is the direction vector of priority flight of UAV i (from current position to the recovery point); $\vec{v}_I(t+1)$ is the adjustment speed of UAV i in the next time step when encountering conflict;

judge whether there are UAVs that fail to complete line recovery, after some UAVs arriving at the specific recovery area, if yes, we reorder some UAVs that failed in recovery, if not, we recycle in order until recovery is completed.

A dynamic recovery system for UAVs, comprising: the UAVs, a first processor, a second processor, a third processor, and a fourth processor, wherein in complex environment, UAVs obtain their own performance information and task information;

a first processor, according to the performance information and task information of each UAV, establishes the total cost function F of dynamic recovery for UAVs, and calculates the total cost function as follows:

$$F = \sum_{i=1}^{N} \left( O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6} \right)$$

wherein, $O_i$ is a permutation of N UAVs; $Q_i$ is the number of tasks waiting to be completed after UAV i is recovered; $\alpha_1$ is the intensity parameter of the effect of the number of tasks waiting to be completed $Q_i$ on the cost function; $T_i^p$ is the waiting time needed to complete other tasks after UAV i is recovered; $\alpha_2$ is the intensity parameter of the effect of the waiting time needed to complete other tasks $T_i^p$ on the cost function; $L_i$ is the distance from the current position of UAV i to the recovery point; $\alpha_3$ is the intensity parameter of the effect of the distance $L_i$ on the cost function; $C_i$ is the number of obstacles that UAV i may encounter in flight; $\alpha_4$ is the intensity parameter of the effect of the number of obstacles $C_i$ on the cost function; $D_i$ is the current damage severity of UAV i; $\alpha_5$ is the intensity parameter of the effect of the current damage severity $D_i$ on the cost function; $T_i^r$ is the current flight time of UAV i; $\alpha_6$ is the intensity parameter of the effect of the current flight time $T_i^r$ on the cost function;

the second processor uses the improved particle swarm optimization algorithm to optimize the total cost function F, and obtains the optimal recovery order of UAVs;

in particle swarm optimization algorithm, the speed and position updating formula of the qth position of the sth particle in the (t+1) generation are as follows:

$$v_{sq}(t+1) = v_{sq}(t) + c_1 \times \text{rand}(\ ) \times (\text{pbest}_{sq}(t) - x_{sq}(t)) + c_2 \times \text{rand}(\ ) \times (\text{gbest}_{sq}(t) - x_{sq}(t)),$$

$$x_{sq}(t+1) = x_{sq}(t) + v_{sq}(t+1);$$

wherein s=1, 2, . . . , n, n is the number of particles, each particle is a permutation of (1, 2, . . . , N), and each permutation corresponds to a value of the cost function F; $v_{sq}(t)$ is the velocity of the qth position of the sth particle in the t generation, $c_1$ and $c_2$ are two constants, and rand( ) is the uniform random number in [0,1], $\text{pbest}_{sq}(t)$ is the qth position of the historical optimal solution of the sth particle in the t generation, $x_{sq}(t)$ is the qth position of the sth particle in the t generation, $\text{gbest}_{sq}(t)$ means that after the historical optimal solutions of the top three particles in the t generation are determined, the qth position corresponding to a solution is randomly selected from the three historical optimal solutions;

the third processor recovers each UAV according to the priority order, and judges whether the UAVs encounter conflict in the dynamic recovery process, if yes, the UAV carries out conflict resolution and flies back in order, if not, the UAV flies back in order, the conflict resolution calculation formula of UAV i is as follows:

$$\vec{v}_I(t+1) = \frac{\vec{v}_i(t+1) + w\vec{g}_i}{|\vec{v}_i(t+1) + w\vec{g}_i|},$$

where $\vec{v}_I(t+1)$ is the flight speed of UAV i in the next time step when encountering conflict, w is the influence weight of priority flight direction, $\vec{g}_I$ is the direction vector of priority flight of UAV i (from current position to the recovery point); $\vec{v}_i(t+1)$ is the adjustment speed of UAV i in the next time step when encountering conflict;

The formula for adjustment speed is:

$$\vec{v}_i(t+1) = -\sum_{j=1}^{n_D} \frac{\vec{r}_{i,j}(t)}{|\vec{r}_{i,j}(t)|},$$

$n_D$ is the number of obstacles and other UAVs within the detection radius $R_D$ of UAV i at time t, and $\vec{r}_{i,j}(t)$ represents the relative position of UAV i, obstacles and other UAV j at time t.

the fourth processor judges whether there are UAVs that fail to complete line recovery when they wait in line and hover around, after some UAVs arrive at the specific recovery area, if yes, we reorder some UAVs that failed in recovery, if not, we recycle in order until recovery is completed.

The cost formula $F_f$ of reordering is as follows:

$$F_f = \sum_{i=1}^{N_f} (O'_i \cdot (Q_i)^{\alpha_1} + O'_i \cdot (T_i^p)^{\alpha_2} + O'_i \cdot (D_i)^{\alpha_5} + O'_i \cdot (T_i^r)^{\alpha_6})$$

$O'_i$ is a permutation of $N_f$ hovering UAVs;

the improved particle swarm optimization algorithm is used to solve the problem again, and the optimal solution is the optimal recovery order of UAVs hovering around.

Each of the first processor, the second processor, the third processor and the fourth processor is independent processor, or all of them are integrated in a single processor.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the claims appended hereto and their equivalents.

What is claimed is:

1. A dynamic recovery method for UAVs, comprising the following steps:

step 1: in flight environment including a number of obstacles, UAVs obtain their own performance information and task information;

step 2: according to the performance information and task information of each UAV, the total cost function F of dynamic recovery for UAVs is established, and the total cost function is calculated as follows:

$$F = \sum_{i=1}^{N} \left( O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6} \right)$$

wherein, $O_i$ is a permutation of N UAVs; $Q_i$ is the number of tasks waiting to be completed after UAV i is recovered; $\alpha_1$ is the intensity parameter of the effect of the number of tasks waiting to be completed $Q_i$ on the cost function; $T_i^p$ is the waiting time needed to complete other tasks after UAV i is recovered; $\alpha_2$ is the intensity parameter of the effect of the waiting time needed to complete other tasks $T_i^p$ on the cost function; $L_i$ is the distance from the current position of UAV i to the recovery point; $\alpha_3$ is the intensity parameter of the effect of the distance $L_i$ on the cost function; $C_i$ is the number of obstacles that UAV i may encounter in flight; $\alpha_4$ is the intensity parameter of the effect of the number of obstacles $C_i$ on the cost function; $D_i$ is the current damage severity of UAV i; $\alpha_5$ is the intensity parameter of the effect of the current damage severity $D_i$ on the cost function; $T_i^r$ is the current flight time of UAV i; $\alpha_6$ is the intensity parameter of the effect of the current flight time $T_i^r$ on the cost function;

step 3: an improved particle swarm optimization algorithm is used to optimize the total cost function F, and the optimal recovery order of UAVs is obtained;

in particle swarm optimization algorithm, the speed and position updating formula of the qth position of the sth particle in the (t+1) generation are as follows:

$v_{sq}(t+1)=v_{sq}(t)+c_1\times\text{rand}(\ )\times(\text{pbest}_{sq}(t)-x_{sq}(t))+c_2\times\text{rand}(\ )\times(\text{gbest}_{sq}(t)-x_{sq}(t));$ $x_{sq}(t+1)=x_{sq}(t)+v_{sq}(t+1);$ wherein s=1, 2, ..., n, n is the number of particles, each particle is a permutation of (1, 2 ..., N), and each permutation corresponds to a value of the cost function F;

$v_{sq}(t)$ is the velocity of the qth position of the sth particle in the t generation, $c_1$ and $c_2$ are two constants, and rand( ) is the uniform random number in [0,1], $\text{pbest}_{sq}(t)$ is the qth position of the historical optimal solution of the sth particle in the t generation, $x_{sq}(t)$ is the qth position of the sth particle in the t generation, $\text{gbest}_{sq}(t)$ means that after the historical optimal solutions of the top three particles in the t generation are determined, the q th position corresponding to a solution is randomly selected from the three historical optimal solutions;

step4: each UAV is recovered according to priority order, and whether the UAVs encounter conflict in the dynamic recovery process is judged, if conflict is encountered, the UAV carries out conflict resolution and flies back to the recovery point in the priority order, if conflict is not encountered, the UAV flies back to the recovery point in the priority order, the conflict resolution calculation formula of UAV i is as follows:

$$\vec{v_i}(t+1) = \frac{\vec{v_i}(t+1) + w\vec{g_i}}{|\vec{v_i}(t+1) + w\vec{g_i}|},$$

where $\vec{v_i}(t+1)$ is the flight speed of UAV i in the next time step when encountering conflict, w is the influence weight of priority flight direction, $\vec{g_i}$ is the direction vector of priority flight of UAV i (from current position to the recovery point); $\vec{v_i}(t+1)$ is the adjustment speed of UAV i in the next time step when encountering conflict;

step5: after arriving at a specific recovery area, one or more UAVs among the UAVs wait in line and hover around to judge whether there are UAVs that fail to complete line recovery, if yes, the one or more UAVs are reordered, if not, the one or more UAVs are recycled in the priority order until recovery is completed.

2. The dynamic recovery method for UAVs according to claim 1, wherein the task information described in step 1 comprises: the current position of each UAV, the position of recovery point, the coordinates of obstacles within the detection radius of each UAV and the coordinate positions of other UAVs;

its performance information comprises: the current flight time of each UAV before recovery, the number of tasks to be performed by each UAV and whether the UAV is damaged.

3. The dynamic recovery method for UAVs according to claim 1, the formula for adjustment speed in step 4 is:

$$\vec{v_i}(t+1) = -\sum_{j=1}^{n_D} \frac{\vec{r_{i,j}}(t)}{|\vec{r_{i,j}}(t)|},$$

$n_D$ is the number of obstacles and other UAVs within the detection radius $R_D$ of UAV i at time t, and $\vec{r_{i,j}}(t)$ represents the relative position of UAV i, obstacles and other UAV j at time t.

4. The dynamic recovery method for UAVs according to claim 1, wherein the cost formula $F_f$ of reordering in step 5 is as follows:

$$F_f = \sum_{i=1}^{N_f}(O'_i \cdot (Q_i)^{\alpha_1} + O'_i \cdot (T_i^p)^{\alpha_2} + O'_i \cdot (D_i)^{\alpha_5} + O'_i \cdot (T_i^r)^{\alpha_6}),$$

where $O'_i$ is a permutation of $N_f$ hovering UAVs;

the improved particle swarm optimization algorithm is used to solve the problem again, and the optimal solution is the optimal recovery order of UAVs hovering around.

5. A non-transitory storage medium comprising instructions that when executed cause a processor of a computing device to:

in flight environment including a number of obstacles, obtain their own performance information and task information by UAVs;

according to the performance information and task information of each UAV, establish the total cost function F of dynamic recovery for UAVs, and the total cost function is calculated as follows:

$$F = \sum_{i=1}^{N}\left(O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6}\right)$$

wherein, $O_i$ is a permutation of N UAVs; $Q_i$ is the number of tasks waiting to be completed after UAV i is recovered; $\alpha_1$ is the intensity parameter of the effect of the number of tasks waiting to be completed $Q_i$ on the cost function; $T_i^p$ is the waiting time needed to complete other tasks after UAV i is recovered; $\alpha_2$ is the intensity parameter of the effect of the waiting time needed to complete other tasks $T_i^p$ on the cost function; $L_i$ is the distance from the current position of UAV i to the recovery point; $\alpha_3$ is the intensity parameter of the effect of the distance $L_i$ on the cost function; $C_i$ is the number of obstacles that UAV i may encounter in flight; $\alpha_4$ is the intensity parameter of the effect of the number of obstacles $C_i$ on the cost function; $D_i$ is the current damage severity of UAV i; $\alpha_5$ is the intensity parameter of the effect of the current damage severity $D_i$ on the cost function; $T_i^r$ is the current flight time of UAV i; $\alpha_6$, is the intensity parameter of the effect of the current flight time $T_i^r$ on the cost function;

by using an improved particle swarm optimization algorithm, optimize the total cost function F, and obtain the optimal recovery order of UAVs;

in particle swarm optimization algorithm, the speed and position updating formula of the qth position of the sth particle in the (t+1) generation are as follows:

$$v_{sq}(t+1) = v_{sq}(t) + c_1 \times \text{rand}(\ ) \times (\text{pbest}_{sq}(t) - x_{sq}(t)) + c_2 \times \text{rand}(\ ) \times (\text{gbest}_{sq}(t) - x_{sq}(t));$$

$$x_{sq}(t+1) = x_{sq}(t) + v_{sq}(t+1);$$

wherein s=1, 2, . . . , n, n is the number of particles, each particle is a permutation of (1, 2, . . . , N), and each permutation corresponds to a value of the cost function F; $v_{sq}(t)$ is the velocity of the qth position of the sth particle in the t generation, $c_1$ and $c_2$ are two constants, and rand( ) is the uniform random number in [0,1], $\text{pbest}_{sq}(t)$ is the qth position of the historical optimal solution of the sth particle in the t generation, $x_{sq}(t)$ is the qth position of the sth particle in the t generation, $\text{gbest}_{sq}(t)$ means that after the historical optimal solutions of the top three particles in the t generation are determined, the qth position corresponding to a solution is randomly selected from the three historical optimal solutions;

recover each UAV according to priority order, and judge whether the UAVs encounter conflict in the dynamic recovery process, if conflict is encountered, the UAV carries out conflict resolution and flies back to the recovery point in priori order, if conflict is not encountered, the UAV flies back to the recovery point in priority order, the conflict resolution calculation formula of UAV i is as follows:

$$\vec{v_i}(t+1) = \frac{\vec{v_i}(t+1) + w\vec{g_i}}{|\vec{v_i}(t+1) + w\vec{g_i}|},$$

where $\vec{v_i}(t+1)$ is the flight speed of UAV i in the next time step when encountering conflict, w is the influence weight of priority flight direction, $\vec{g_i}$ is the direction vector of priority flight of UAV i (from current position to the recovery point); $\vec{v_i}(t+1)$ is the adjustment speed of UAV i in the next time step when encountering conflict;

judge whether there are UAVs that fail to complete line recovery, after one or more UAVs among the UAVs arriving at a specific recovery area, if yes, the one or more UAVs are reordered, if not, the one or more UAVs are recycled in the priority order until recovery is completed.

6. A dynamic recovery system for UAVs, comprising: the UAVs, a first processor, a second processor, a third processor, and a fourth processor, wherein in flight environment including a number of obstacles, UAVs obtain their own performance information and task information;

a first processor, according to the performance information and task information of each UAV, establishes the total cost function F of dynamic recovery for UAVs, and calculates the total cost function as follows:

$$F = \sum_{i=1}^{N}\left(O_i \cdot (Q_i)^{\alpha_1} + O_i \cdot (T_i^p)^{\alpha_2} + \frac{(L_i)^{\alpha_3}}{O_i} + \frac{(C_i)^{\alpha_4}}{O_i} + O_i \cdot (D_i)^{\alpha_5} + O_i \cdot (T_i^r)^{\alpha_6}\right)$$

wherein, $O_i$ is a permutation of N UAVs; $Q_i$ is the number of tasks waiting to be completed after UAV i is recovered; $\alpha_1$ is the intensity parameter of the effect of the number of tasks waiting to be completed $Q_i$ on the cost function; $T_i^p$ is the waiting time needed to complete other tasks after UAV i is recovered; $\alpha_2$ is the intensity parameter of the effect of the waiting time needed to complete other tasks $T_i^p$ on the cost function; $L_i$ is the distance from the current position of UAV i to the recovery point; $\alpha_3$ is the intensity parameter of the effect of the distance $L_i$ on the cost function; $C_i$ is the number of obstacles that UAV i: may encounter in flight; $\alpha_4$ is the intensity parameter of the effect of the number of obstacles $C_i$ on the cost function; $D_i$ is the current damage severity of UAV i; $\alpha_5$ is the intensity parameter of the effect of the current damage severity $D_i$ on the cost function; $T_i^r$ is the current flight time of UAV i; $\alpha_6$ is the intensity parameter of the effect of the current flight time $T_i^r$ on the cost function;

the second processor uses an improved particle swarm optimization algorithm to optimize the total cost function F, and obtains the optimal recovery order of UAVs;

in particle swarm optimization algorithm, the speed and position updating formula of the qth position of the sth particle in the (t+1) generation are as follows:

$v_{sq}(t+1)=v_{sq}(t)+c_1\times\text{rand}(\ )\times(pbest_{sq}(t)-x_{sq}(t))+c_2\times \text{rand}(\ )\times(gbest_{sq}(t)-x_{sq}(t));$ $x_{sq}(t+1)=x_{sq}(t)+v_{sq}(t+1);$ wherein s=1, 2, . . . n, n is the number of particles, each particle is a permutation of (1, 2, . . . , N), and each permutation corresponds to a value of the cost function F;

$v_{sq}(t)$ is the velocity of the qth position of the sth particle in the t generation, $c_1$ and $c_2$ are two constants, and rand( ) is the uniform random number in [0,1], $pbest_{sq}(t)$ is the qth position of the historical optimal solution of the sth particle in the t generation, $x_{sq}(t)$ is the qth position of the sth particle in the t generation, $gbest_{sq}(t)$ means that after the historical optimal solutions of the top three particles in the t generation are determined, the q th position corresponding to a solution is randomly selected from the three historical optimal solutions;

the third processor recovers each UAV according to priority order, and judges whether the UAVs encounter conflict in the dynamic recovery process, if conflict is encountered, the UAV carries out conflict resolution and flies back to the recovery point in the priority order, if conflict is not encountered, the UAV flies back to the recovery point in the priority order, the conflict resolution calculation formula of UAV i is as follows:

$$\vec{v_i}(t+1) = \frac{\vec{v_i}(t+1) + w\vec{g_i}}{|\vec{v_i}(t+1) + w\vec{g_i}|},$$

where $\vec{v_i}(t+1)$ is the flight speed of UAV i in the next time step when encountering conflict, w is the influence weight of priority flight direction, $\vec{g_i}$ is the direction vector of priority flight of UAV i (from current position to the recovery point); $\vec{v_i}(t+1)$ is the adjustment speed of UAV i in the next time step when encountering conflict;

the fourth processor judges whether there are UAVs that fail to complete line recovery when one or more UAVs among the UAVs wait in line and hover around after arriving at a specific recovery area, if yes, the one or more UAVs are reordered, if not, the one or more UAVs are recycled in the priority order until recovery is completed.

7. The dynamic recovery system for UAVs according to claim 6, wherein the task information comprises: the current position of each UAV, the position of recovery point, the coordinates of obstacles within the detection radius of each UAV and the coordinate positions of other UAVs;

its performance information comprises: the current flight time of each UAV before recovery, the number of tasks to be performed by each UAV and whether the UAV is damaged.

8. The dynamic recovery system for UAVs according to claim 6, the formula for adjustment speed is:

$$\vec{v_i}(t+1) = -\sum_{j=1}^{n_D}\frac{\vec{r_{i,j}}(t)}{|\vec{r_{i,j}}(t)|},$$

$n_D$ is the number of obstacles and other UAVs within the detection radius $R_D$ of UAV i at time t, and $\vec{r}_{ij}(t)$ represents the relative position of UAV i, obstacles and other UAV j at time t.

9. The dynamic recovery system for UAVs according to claim 6, wherein the cost formula $F_f$ of reordering is as follows:

$$F_f = \sum_{i=1}^{N_f}(O'_i \cdot (Q_i)^{\alpha 1} + O'_1 \cdot (T_i^p)^{\alpha 2} + O'_i \cdot (D_i)^{\alpha 5} + O'_i \cdot (T_i^r)^{\alpha 6})$$

where $O'_i$ is a permutation of $N_f$ hovering UAVs;

the improved particle swarm optimization algorithm is used to solve the problem again, and the optimal solution is the optimal recovery order of UAVs hovering around.

* * * * *